United States Patent
Van der Lely

[15] 3,683,601
[45] Aug. 15, 1972

[54] MOWING MECHANISMS
[72] Inventor: Cornelis Van der Lely, 7, Bruschenrain, Zug, Switzerland
[22] Filed: Feb. 27, 1970
[21] Appl. No.: 15,124

[30] Foreign Application Priority Data
  March 5, 1969   Netherlands..............6903371

[52] U.S. Cl......................................................56/6
[51] Int. Cl. ............................................A01d 75/30
[58] Field of Search............................................56/6

[56] References Cited
UNITED STATES PATENTS

| | | |
|---|---|---|
| 1,693,475 | 11/1928 | Clepper.....................56/6 UX |
| 3,418,790 | 12/1968 | Whitfield et al.................56/6 |
| 2,460,847 | 2/1949 | Schwartz...................56/6 UX |
| 3,262,254 | 7/1966 | Van der Lely et al...........56/6 |

*Primary Examiner*—Robert Peshock
*Attorney*—Mason, Mason & Albright

[57] ABSTRACT

A mower has a plurality of side-by-side mowing elements with adjoining cutter bars, the adjacent ends of the frame portions carrying the mowing elements are pivoted to one another and each portion is connected to a displaceable support so that the mowing elements can move up and down over uneven ground during operation. The displaceable supports of adjacent mowing elements can be connected to one another through a rocker so that the movements of one element affect the movements of the other. Also, a hydraulic system can be connected to the rocker and to one or both frame portions. The mower includes a conveyor and reel for each frame portion with an elevator between the portions.

13 Claims, 8 Drawing Figures

Patented Aug. 15, 1972

3,683,601

3 Sheets-Sheet 1

INVENTOR
CORNELIS VAN DER LELY
BY
Mason, Mason & Albright
Attorneys

Patented Aug. 15, 1972
3,683,601
3 Sheets-Sheet 3
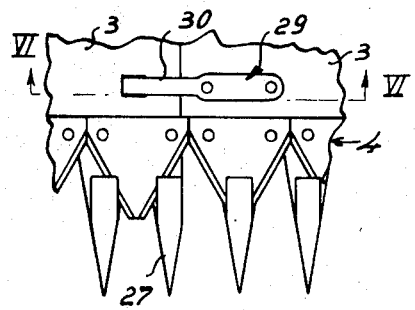
FIG. 5
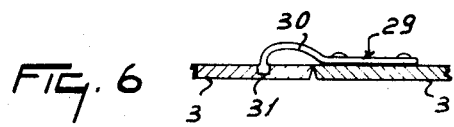
FIG. 6
FIG. 7
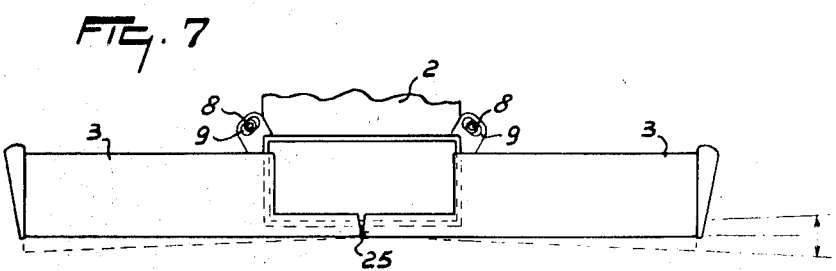
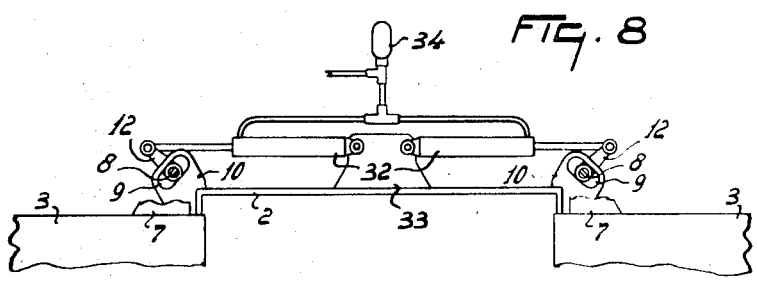
FIG. 8
INVENTOR
CORNELIS VAN DER LELY
BY
Mason, Mason & Albright
Attorneys

MOWING MECHANISMS

When such mowing mechanisms form parts of combine harvesters, swath mowers or other machines of large working width, there is a tendency to erratic mowing at the outer ends of the mowing elements during operation on undulating or uneven land. An object of the invention is to overcome, or at least greatly reduce, this disadvantageous tendency.

According to the invention, there is provided a mowing mechanism of the kind set forth, wherein at least one of the mowing elements is carried by a support which is displaceable relative to the frame and/or the other mowing element in such a way as to allow the end of said one of the mowing elements remote from said other mowing element to move upwardly and downwardly during the use of the mechanism to match undulations in the surface of the land that the mechanism encounters.

Figure 1:
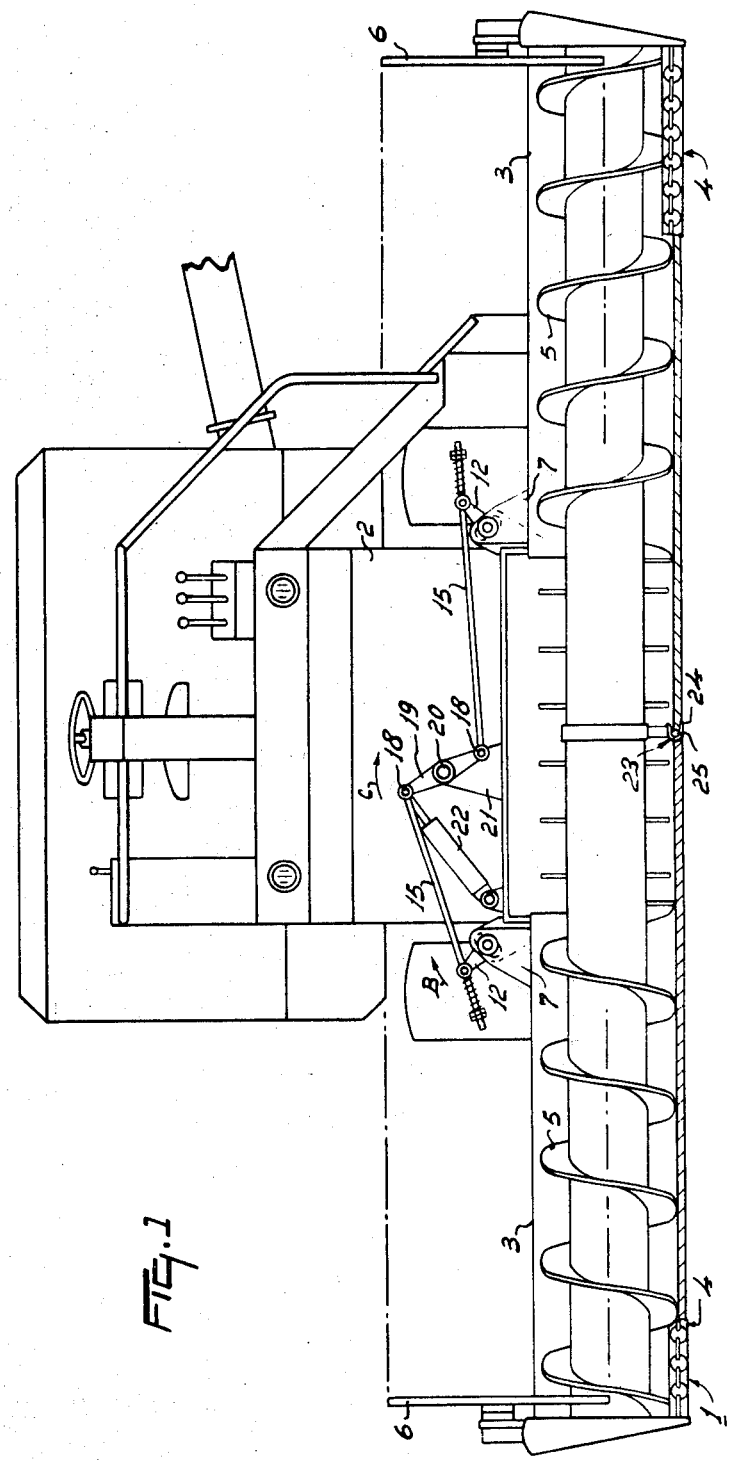
Figure 2:
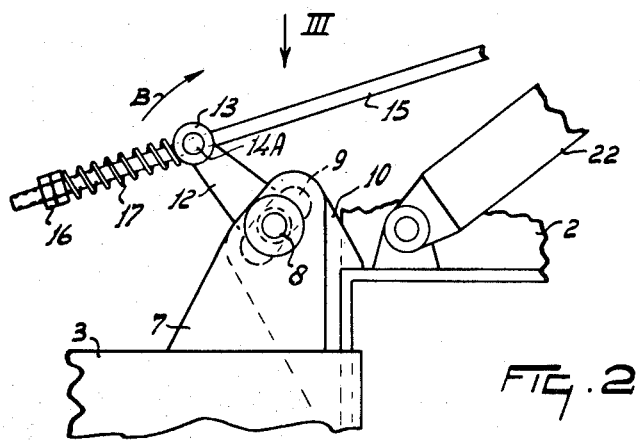
Figure 3:
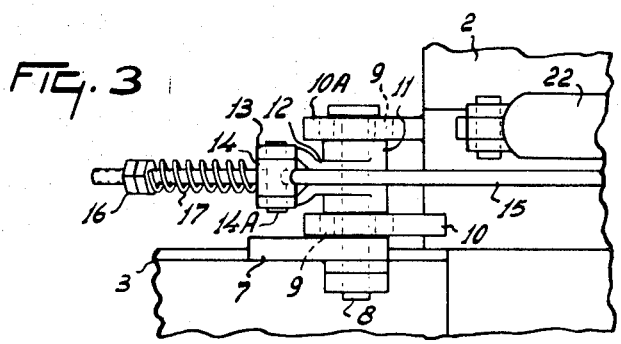
Figure 4:
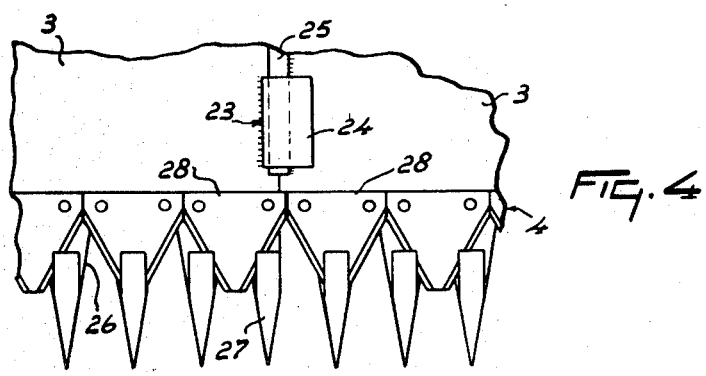

For a better understanding of the invention, and to show how the same may be carried into effect, reference will now be made, by way of example, to the accompanying drawings, in which:

FIG. 1 is a front view of a combine harvester provided with mowing mechanism in accordance with the invention, FIG. 2 is a scrap front view, to an enlarged scale, showing certain parts that can be seen in FIG. 1 in greater detail, FIG. 3 is a plan view as seen in the direction indicated by the arrow III of FIG. 2, FIG. 4 is a scrap plan view, to an enlarged scale as compared with FIG. 1, showing the construction and arrangement of parts located at the adjoining ends of two portions of the mowing mechanism of FIG. 1, FIG. 5 corresponds to FIG. 4 but shows an alternative construction, FIG. 6 is a section taken on the line VI—VI of FIG. 5, FIG. 7 is a diagrammatic front elevation, generally corresponding to FIG. 1 but to a reduced scale, illustrating the way in which the two portions of the mowing mechanism can match undulations in the surface of the ground over which the combine harvester moves during the use thereof, and FIG. 8 is a further diagrammatic front elevation showing an alternative construction in which the two portions of the mowing mechanism can be moved hydraulically.

Referring to FIGS. 1 to 7 of the drawings, the combine harvester which is illustrated is provided, at its front, with mowing mechanism in accordance with the invention, said mowing mechanism comprising a mowing platform 1 from which cut crop is fed to an elevator 2 that carries said crop to threshing parts of the combine harvester. The mowing platform 1 has two interconnected portions 3, each portion 3 including a corresponding mowing element in the form of a cutter bar 4. In the use of the combine harvester, the two cutter bars 4 are in substantial longitudinal alignment in a direction extending substantially horizontally perpendicular to the intended direction of operative travel of the combine harvester, the ends of the cutter bars that are located centrally of the mowing mechanism being in adjoining relationship with one another. Transverse conveyors in the form of helical augers 5 are located behind the two cutter bars 4 and it can be seen from FIG. 1 of the drawings that the blades of the two augers 5 are wound in relatively opposite directions in such a way that they will move cut crop which they engage transversely in opposite directions towards a central region of the mowing mechanism that is in line with the elevator 2. The ends of the two augers 5 that are located centrally of the mowing mechanism adjoin one another when said mowing mechanism is in an operative position. Each portion 3 of the mowing platform 1 is also provided with a corresponding reel 6 most of which is shown only in broken outline in FIG. 1 of the drawings to avoid concealing other parts.

At the rear of the mowing platform 1 adjacent the opposite lateral sides of the elevator 2 each portion 3 of the platform is provided with a corresponding support 7 to which a corresponding support shaft 8 (FIGS. 2 and 3) is secured. The two shafts 8 extend substantially horizontally parallel to the intended direction of operative travel of the combine harvester and, since both of them are arranged in substantially the same way, a detailed description of the parts that are associated with only one of the two shafts 8 will suffice. The left-hand shaft 8 (as seen in FIG. 1 of the drawings) is received in arcuate slots 9 formed in a pair of horizontally spaced apart supporting plates 10 and 10A. The supporting plates 10 and 10A are located one behind the other in the intended direction of operative travel of the combine harvester and project from one of the lateral sides of the supporting structure of the elevator 2. A sleeve 11 fixedly surrounds the shaft 8 between the plates 10 and 10A, said sleeve carrying an arm 12 formed with a fork 13 at its free end. A block 14 is pivotally mounted between the limbs of the fork 13 with the aid of a pivot pin 14A with a hole to allow a rod 15 to pass slidably through the block 14 in a direction that is perpendicular to, and that intersects, the pivotal axis afforded by the pin 14, which is locked in place by the rod 15. The end of the rod 15 that is located near the block 14 is screw-threaded and carries a pair of nuts 16 that can be moved lengthwise along the screw-thread and locked together at any desired position therealong in known manner. A helical compression spring 17 surrounds the rod 15 and bears with its opposite ends against the block 14 and one of the two nuts 16 respectively.

As can be seen in FIG. 1 of the drawings, the end of the left-hand (in that Figure) rod 15 that is remote from the nuts 16 is pivotally connected by a pin 18 to the upper end of a rocker 19 which rocker is turnable about a substantially horizontal pivot 20 mounted on a support 21 carried by an upper horizontal region of the elevator supporting structure located at the front of that elevator with respect to the intended direction of operative travel of the combine harvester. As will be evident from FIG. 1 of the drawings, a second pivot pin 18 connects the lowermost end of the rocker 19 to one end of a second rod 15 which is linked to the right-hand (in FIG. 1) portion 3 of the mowing platform 1 by parts that are substantially symmetrically identical to those parts which have already been described with reference to FIGS. 2 and 3 of the drawings.

The upper one of the two pivot pins 18 is also pivotally connected to the free end of the piston rod of a hydraulic piston and cylinder assembly 22 whose cylinder is pivotally connected to the supporting structure of the elevator 2 adjacent the supporting plates 10 and 10A in the manner which can be seen in FIGS. 1, 2 and 3 of the drawings. The two portions 3 of the mowing platform 1 are provided, at their central adjoining ends, with a pivotal connection that is generally indicated by the reference 23, said pivotal connection 23 being located rearwardly, with respect to the intended direction of operative travel of the combine harvester, from the cutter bars 4. The pivotal connection 23 comprises a clamping jaw 24 (FIGS. 1 and 4) which is of approximately U-shaped cross-section and a pin 25 of circular cross-section, the jaw 24 being welded or otherwise rigidly secured to one of the platform portions 3 whilst the pin 25 is welded or otherwise secured to the other platform portion 3. It will be seen that the pin 25 is turnable in the jaw 24 about a substantially horizontal axis that extends substantially parallel to the intended direction of operative travel of the combine harvester. The cutter bar 4 carried by the platform portion 3 which is provided with the jaw 24 includes a finger bar 26 one end finger 27 of which serves as a common finger for the two neighboring end blades 28 of the two cutter beams or knife bars that are carried by the respective platform portions 3. The two cutter beams or knife bars that have just been mentioned are driven, during use of the mowing mechanism, by transmission parts that are not shown in the drawings in such a way that they move in synchronism with one another.

FIGS. 5 and 6 of the drawings show an alternative construction in which a pivotal connection that is generally indicated by the reference 29 takes the form of a spring steel clamp 30 one end of which is bolted or riveted to one of the platform portions 3 whilst its other end is bent over so as to snap into a recess 31 formed in the upper surface of the other platform portion 3. The resiliency and configuration of the clamp 30 allows pivotal movement of the two platform portions 3 relative to one another about a substantially horizontal axis generally coinciding with the line along which said two portions contact one another.

Although the mowing mechanism which has been described forms part of a combine harvester, it will be realized that it could equally well form part of a mowing machine intended only for the formation of swaths of cut crop. The mechanism could also form part of an agricultural vehicle intended for the cutting and collection of crop with or without drying of that crop. In the use of the mowing mechanism which has been described, it occupies a working position corresponding to that shown in FIG. 1 of the drawings with the cutter bars 4 and platform portions 3 in adjoining end-to-end relationship. The platform portions 3 are then pivotally interconnected by either the connection 23 or the connection 29. In the pivotal connection 23, the pivotal axis substantially coincides with the longitudinal axis of the pin 25 and the two platform portions 3, with the cutter bars 4 and the other parts which they support, can turn relative to one another about the pivotal axis just mentioned through an angle of about 5° as shown in broken lines in FIG. 7 of the drawings. Although 5° is a convenient magnitude for this angle, it is not essential that it should be of that size and it may be more, or less, if preferred. When the combine harvester or other implement moves over undulating ground, the relative pivotal motion which is possible between the two platform portions 3 enables the platform 1 to match the ground surface in such a way that the opposite end regions thereof do not tend to lift off, or dig into, undulating ground thus overcoming, or appreciably reducing, a disadvantage of known broad working width mowing mechanisms when used on undulating land.

Pivotal motion of the platform portions 3 relative to one another is allowed for by the shafts 8 moving through the arcuate slots 9 whose centers of curvature coincide with the pivotal axis of either the connection 23 or the connection 29. When the outer end of one of the platform portions 3 moves upwardly, the corresponding shaft 8 moves through the slots 9 in the direction indicated by an arrow B in FIGS. 1 and 2 of the drawings. Clearly, the shaft 8 moves in an opposite direction through the slots 9 upon downward movement of the outer end of the corresponding platform portion 3. During such downward movement, the shaft 8, which supports the platform portion 3, is displaced against the resilient opposition of the corresponding spring 17. The arrangement is such that, while the outermost ends of the two platform portions 3 can move upwardly and downwardly as required, the adjoining ends thereof cannot move upwardly and downwardly relative to one another by virtue of the nature of the pivotal connection 23 or 29 between them. The adjoining ends of the cutter bars 4 thus co-operate correctly with one another at all times so that undisturbed mowing can continue at all times throughout the effective width of the platform 1.

The mowing mechanism can be brought to an inoperative position suitable for transport by turning each platform portion 3 and the parts which it carries upwardly about the corresponding supporting shaft 8. This is accomplished by extending the piston rod of the assembly 22 so that the rocker 19 turns about its pivot 20 in the direction indicated by an arrow C in FIG. 1 of the drawings. The shafts 8 are turned about their axes by the arms 12 and the supports 7 move the two platform portions 3 through approximately 90° each into substantially vertically disposed positions in which the overall width of the mowing mechanism is very much reduced compared with the working width as shown in FIG. 1. It will be appreciated that the arms 12 are turned through the intermediary of the compressed springs 17 so that a safety factor is provided in the event of any unnoticed obstacle to the upward movement of the platform portions 3. The pivotal connection 23 or 29 is automatically uncoupled during movement of the platform portions 3 into their inoperative transport position.

FIG. 8 shows an alternative construction in which each platform portion 3 is raised into its inoperative transport position by a hydraulic piston and cylinder assembly 32 that is individual thereto. The cylinders of the two assemblies 32 are pivotally connected to a common support 33 mounted on the supporting structure of the elevator 2 and the free ends of the piston rods thereof are respectively pivotally connected to the ends of the arms 12 that are remote from the shafts 8. The rocker 19 and rods 15 are thus rendered unnecessary. The hydraulic circuit of which the piston and cylinder assemblies 32 form a part is shown diagrammatically in FIG. 8 and includes two flexible ducts that are connected to the cylinders of the two assemblies 32. A duct which supplies the two flexible ducts which have just been mentioned is provided with an accumulator 34 which may, for example, be a hydrau-pneumatic accumulator of known construction in which a volume of gas, normally separated from the oil or other hydraulic liquid by a diaphragm, is contained in such a way that oil or other liquid forced into the accumulator will compress the gas and thus provide a source of power tending to eject the oil from the accumulator as soon as the superior compressing force is removed. The arrangement is, in fact, such that the accumulator 34 tends to provide a resilient support of the platform portions 3 by acting to maintain the shafts 8 centrally of the two arcuate slots 9 as shown in FIG. 8.

Although it is preferred that both portions 3 of the mowing platform 1 should be mounted in such a way that their outer ends can move upwardly and downwardly, it will be realized that this is not absolutely essential and that, for some purposes, it is sufficient to mount one portion 3 in a fixed position relative to the frame of the combine harvester or other machine while the other portion 3 can move upwardly and downwardly as previously described.

Having thus described my invention what I claim as new and desire to secure by Letters Patent of the United States is:

1. A mowing machine including a frame and a mowing mechanism comprising at least two portions each of which carries at least one mowing element, said portions being positioned side-by-side to extend transverse to the direction of travel and supported on said frame, the adjacent ends of said portions being directly and pivotally interconnected to one another at their lower aspects, the upper aspects of said portions being associated with one another through displaceable support means, said support means including interconnected shaft means for each portion, the shaft means of each portion being interconnected to one another and each shaft means also being displaceably connected to its respective portion through a slotted plate unit attached to said portion, each shaft means being movable along a slot of its corresponding plate unit, the outer ends of said mowing elements being movable independently of one another in vertical directions to match ground undulations while the working width of said mowing platform remains substantially the same during operation.

2. A mowing machine as claimed in claim 1, wherein each shaft means is displaceable in at least one direction against resilient means associated with said support means.

3. A mowing machine as claimed in claim 2, wherein each shafts means is a shaft about which a corresponding mowing element is pivotable.

4. A mowing machine as claimed in claim 1, wherein the mowing elements are mounted on a combine harvester and said mowing elements are supported on a mowing platform, a transverse conveyor being supported on said frame in back of said mowing elements with respect to the direction of travel, said mowing platform being connected to an elevator positioned to feed the combine harvester, a separate shaft for each of said mowing elements and two of said support shafts being located at relatively opposite sides of said elevator.

5. A mowing machine as claimed in claim 1, wherein said mowing elements are cutter bars located in substantially horizontal end-to-end alignment with their relatively closest ends adjoining one another, the knife bars of said cutter bars being driven in synchronism with one another by a driving mechanism during operation of said mowing mechanism.

6. A mowing machine as claimed in claim 1, wherein the outer ends of each mowing element can move upwardly and downwardly about the pivot interconnection through an arc substanding an angle of approximately 5° relative to an axis bearing a fixed position with respect to said frame.

7. A mowing machine including a frame and a mowing mechanism comprising a plurality of mowing elements positioned side-by-side, transverse to the direction of travel and supported on said frame, the adjacent ends of said mowing elements being directly interconnected to one another by a pivot connection at their lower aspects, the upper aspects of said mowing elements being associated with one another through displaceable support means, each mowing element being connected to its respective displaceable and separate support shaft of said support means and said shaft being located at the rear of a frame portion of said frame which carries said mowing element with respect to the direction of travel, each support shaft being retained for movement within a slot of said support means and said slot being of arcuate formation the center of curvature of which substantially coincides with the axis of the pivot connection, the shafts of each mowing element being interconnected to one another, whereby the outer ends of said portions can move independently of one another to match ground undulations while the working width of the mechanism remains essentially the same.

8. A mowing machine as claimed in claim 7, wherein said frame includes portions and said pivot connection has parts located behind the cutters of said mowing elements with respect to the direction of travel and between said frame portions, each of which carry one of said mowing elements.

9. A mowing machine as claimed in claim 8, wherein said pivot connection is a clamping jaw secured to one frame portion associated with one of said mowing elements and a cooperating pin is secured to another frame portion associated with said second mowing element, said pin extending longitudinally parallel to the direction of travel of said machine.

10. A mowing machine as claimed in claim 8, wherein said pivot connection includes a resilient clamp extending between said frame portions, said resilient clamp being fastened to one frame portion and being connected with a second frame portion by projecting means which is entered in a recess formed in said second frame portion.

11. A mowing machine as claimed in claim 7, wherein each support shaft is connected to a lifting device on said frame, said lifting device including a rod, one end of which is pivotally connected to a rocker and the opposite end of said rod is connected to an arm on said support shaft, a compression spring being mounted on said rod to resiliently oppose the movements of said arm in at least one direction.

12. A mowing machine as claimed in claim 11, wherein said lifting device includes at least one hydraulic piston and cylinder assembly connected to said mowing element, each rod having a pivot shaft which is connected to its respective hydraulic piston and cylinder assembly, a hydraulic circuit on said machine in communication with the piston and cylinder assemblies and an accumulator is associated with the circuit whereby displacement of a support shaft of one mowing element in either of two opposite directions from a central equilibrium position, is resiliently opposed by said accumulator.

13. A mowing machine as claimed in claim 12, wherein a single accumulator is positioned centrally in said circuit relative to said hydraulic piston and cylinder assemblies.

* * * * *